Figures 1, 2:
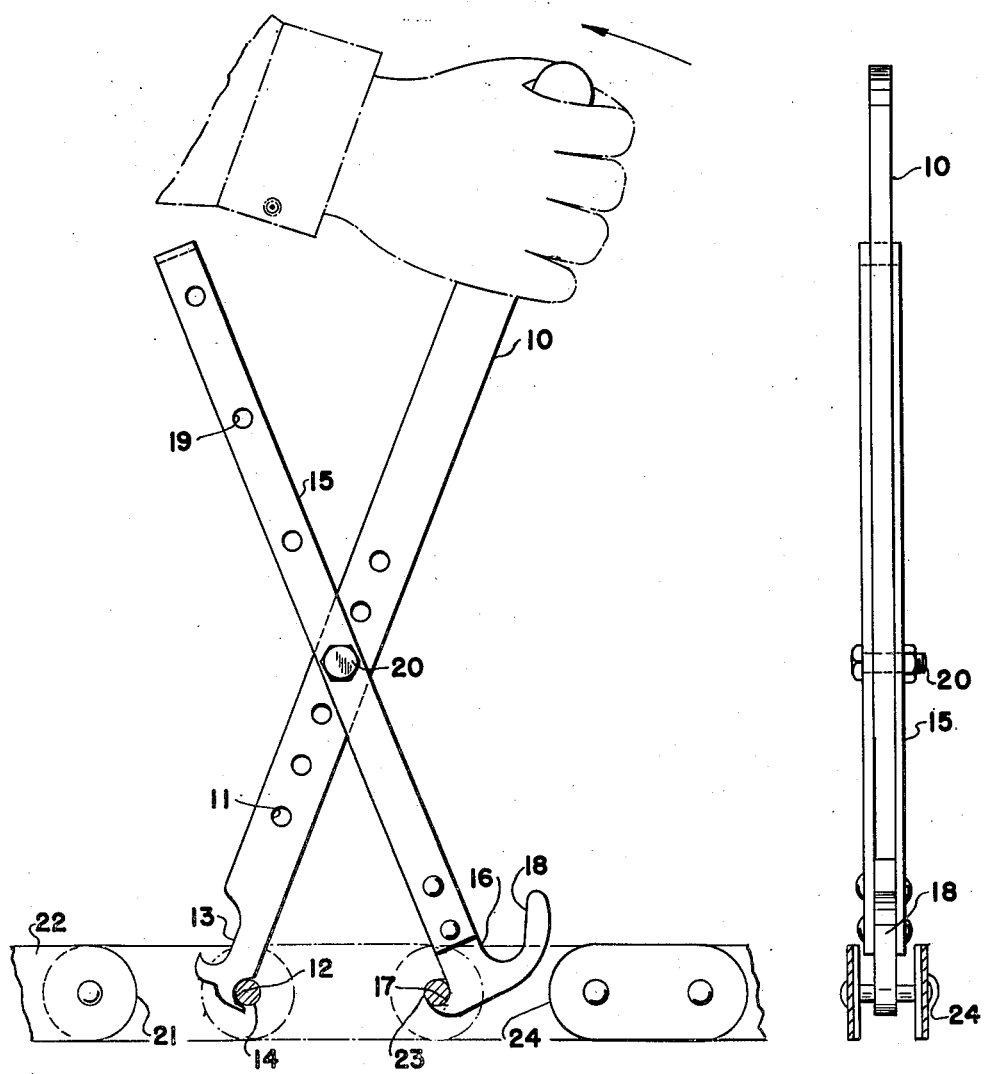

July 25, 1950 — R. E. WINEBRENNER — 2,516,357
CONVEYER RETRACTION DEVICE
Filed Feb. 16, 1948

INVENTOR.
ROBERT E. WINEBRENNER
BY Howard J. Whelan
ATTORNEY

Patented July 25, 1950

2,516,357

UNITED STATES PATENT OFFICE 2,516,357

CONVEYER RETRACTION DEVICE

Robert E. Winebrenner, Hanover, Pa.

Application February 16, 1948, Serial No. 8,693

6 Claims. (Cl. 254—78)

This invention refers to retraction devices and more particularly to one intended for drawing the links of a conveyor chain together when it is apart, before being aligned and made complete for work or use.

Chains used in conveyor structures are open or unlinked during their assembly to the conveyor. The end links are brought as close to one another before they are connected to one another. By reason of weight, tension and other items the complete juncture of these links is a strenuous and uncertain undertaking, but must be accomplished. It is commonly accomplished through the use of block and tackle or through the use of crowbars. These arrangements have the disadvantage of requiring considerable time for their attachment, and causing damage to the parts or finishes of the equipment. The placing of pins or bolts to complete the fastening also is a difficult matter because these mechanical facilities for bringing the chain ends together, are cumbersome and liable to interfere with this operation.

It is therefore an object of the present invention to provide a new and improved device for facilitating the work of joining conveyor chains and the like together.

Another object of the invention is to provide a new and improved device for manually connecting spread chains for conveyors so they will be readily brought together for pinning and bolting.

An additional object of the herein described invention is to provide a new and improved tightening tool for the conveyor chains that will be adjustable, simple in structure, easily manipulated and effective under the various conditions met with in this work.

For a clearer understanding of the invention, its objects and principles thereof, reference is made to the accompanying drawings, which together with the following description portray a particular form of the invention by way of example, while the scope of the invention is indicated in the claims.

In the drawings:

Figure 1 is a side elevation of a tightening tool for conveyor chains embodying this invention, and Figure 2 is an end elevation of Figure 1.

Similar reference characters refer to similar parts throughout the drawings.

In the particular form of the invention described in this instance, a tightening tool consists of two main members connected to one another in the style of scissors or tongs, adjustably positioned so they may be adjusted to suit variable conditions of use. Hooks are arranged on the tool for engagement in the links of a conveyor chain, while other portions are manually operated by the user to close up the jaws of the tool and force the links together so they may be bolted and fastened.

Referring to the drawings. In this particular form, a straight lever bar 10 is provided with a series of transverse holes 11 arranged longitudinally at spaced intervals in the jaw half of the bar. The end portion of the jaw half is formed with hook contours 12 and 13 on opposite sides, of a size and type suitable for engaging into the rollers 14 transversely disposed across a link of a conventional conveyor. A channeled bar 15 bent into a restricted U-form holds a hook member 16 having hooks 17 and 18 formed in it somewhat similar to the hook contours 12 and 13, already mentioned. The channeled bar 15 is provided with holes 19 transversely arranged in it and spaced along its longitudinal axis and intended for adjustable alignment with the holes 11 in the lever bar individually, depending on how the adjustment is to be arranged. A bolt 20 passes through two of the aligned holes 11 and 19 and used for keeping the lever bar 10 and the channeled bar 15 in the selected adjustment, and holds them together but pivots and permits them to swing on each other.

In the use of the device, the hook 12 is engaged with the roller 14 of a link 21 used with a conveyor 22, while the corresponding hook 17 on the channeled bar 15 is engaged with the roller 23 of another link 24 to be pulled up towards the former. The operator then forces the lever bar 10 in the direction of the arrow. This brings the links 14 and 24 together so they can be fastened in place by a pin passing through their end portions. After fastening, the operator releases the hooks from the rollers and removes the tool out of the conveyor. It is then ready for further use or the other hooks 13 and 18 utilized when used for larger conveyor chains. If necessary other adjustments are made in the length of the jaws by replacement of the bolt and nut 20 in such other holes 11 and 19 as may be deemed more suitable in the next instance. The bars may be reversed to act oppositely, if desired.

While but one general form of the invention is shown in the drawings and described in the specifications, it is not desired to limit this application for patent to this particular form or in any other way otherwise than limited by the scope of the appended claims.

Having thus described the invention, what is claimed is:

1. A tightening tool for chains comprising in combination, a lever bar having a plurality of opposed hook portions of different sizes formed at one end thereof and the opposite end to be used as a handle for manipulation, and another bar with similar opposed hook portions of different sizes formed on one end, and means for pivoting them together, said hook portions being arranged for the selective engagement with links of a chain to be brought together.

2. A tightening tool for chains comprising in combination, a lever bar having a plurality of opposed hook portions of different sizes formed at one end thereof and the opposite end to be used as a handle for manipulation, and another bar with similar opposed hook portions of different sizes formed on one end, and means for pivoting them together, said hook portions being arranged for the selective engagement with links of a chain to be brought together, and means for adjusting the length of the bars in regard to each other to facilitate the spread of the links apart from each other.

3. A tightening tool for chains comprising in combination a lever bar having a plurality of opposed hook portions of different sizes formed at one end thereof and the opposite end to be used as a handle for manipulation, and another bar with similar opposed hook portions of different sizes formed on one end, and means for pivoting them together, said hook portions being arranged for the selective engagement of links with a chain to be brought together, means for adjusting the length of the bars in regard to each other to facilitate the spread of the links apart from each other, said last mentioned means including a series of holes longitudinally arranged in both of said bars for facilitating the placement of the first mentioned means thereon to make the adjustment predetermined.

4. A tightening tool for chains comprising in combination, a lever bar having a plurality of opposed hook portions of different sizes formed at one end thereof and the opposite end to be used as a handle for manipulation, and another bar with similar opposed hook portions of different sizes formed on one end, and means for pivoting them together, said hook portions being arranged for the selective engagement with links of a chain to be brought together, means for adjusting the length of the bars in regard to each other to facilitate the spread of the links apart from each other, said last mentioned means including a series of holes longitudinally arranged in both of the bars for facilitating the placement of the first mentioned means thereon to make the adjustment predetermined, said second mentioned bar being of bifurcated form where the said means are used to connect it with the lever bar.

5. A tightening tool for chains comprising in combination, a lever bar having a plurality of opposed hook portions of different sizes formed at one end thereof and the opposite end to be used as a handle for manipulation, and another bar with similar opposed hook portions of different sizes formed on one end, and means for pivoting them together, said hook portions being arranged for the engagement with links of a chain to be brought together, means for adjusting the length of the bars in regard to each other to facilitate the spread of the links apart from each other, said last mentioned means including a series of holes longitudinally arranged in both of the bars for facilitating the placement of the first mentioned means thereon to make the adjustment predetermined, said second mentioned bar being of bifurcated form where the said means are used to connect it with the lever bar, said bars being reversible to permit selective engagement of said hook portions with the links of the chain.

6. A tightening tool for chains comprising in combination, a lever bar having a plurality of opposed hook portions of different sizes formed at one end thereof and the opposite end to be used as a handle for manipulation, and another bar with similar opposed hook portions of different sizes formed on one end, and means for pivoting them together, said hook portions being arranged for the engagement with links of a chain to be brought together, means for adjusting the length of the bars in regard to each other to facilitate the spread of the links apart from each other, said last mentioned means including a series of holes longitudinally arranged in both of the bars for facilitating the placement of the first mentioned means thereon to make the adjustment predetermined, said second mentioned bar being of bifurcated form where the said means are used to connect it with the lever bar, said hook portions being adapted for reversibility, said bars being not only adjustable in regard to each other but reversible so the hook portions may be used oppositely to that previously indicated herein.

ROBERT E. WINEBRENNER.

REFERENCES CITED

The following references are of record in the file of this patent:

UNITED STATES PATENTS

| Number | Name | Date |
|---|---|---|
| 1,390,613 | Hill | Sept. 13, 1921 |
| 1,453,874 | Hotchkiss | May 1, 1923 |
| 1,659,411 | Schmidt | Feb. 14, 1928 |
| 1,994,270 | Cetrano | Mar. 12, 1935 |